US012801356B2

(12) United States Patent
Maikhuri et al.

(10) Patent No.: US 12,801,356 B2
(45) Date of Patent: Nov. 17, 2026

(54) SYSTEMS AND METHODS FOR INTELLIGENT RETRIEVAL OF SOURCE CODE

(71) Applicant: Dell Products L.P., Round Rock, TX (US)

(72) Inventors: Ajay Maikhuri, Bangalore (IN); Praful Sarashetti, Bangalore (IN); Chinna Babu Singanamala, Bangalore (IN); Stevens Philip, Ghaziabad (IN); Vedansh Gupta, Kanpur (IN)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 18/637,859

(22) Filed: Apr. 17, 2024

(65) Prior Publication Data

US 2025/0328320 A1 Oct. 23, 2025

(51) Int. Cl.
*G06F 8/36* (2018.01)

(52) U.S. Cl.
CPC .................................... *G06F 8/36* (2013.01)

(58) Field of Classification Search
CPC .................................... G06F 8/30; G06F 8/36
See application file for complete search history.

(56) References Cited

U.S. PATENT DOCUMENTS

| | | | | |
|---|---|---|---|---|
| 11,003,426 B1 * | 5/2021 | Wilson | G06F 9/45508 | |
| 2010/0106705 A1 * | 4/2010 | Rush | G06F 16/907 | 707/723 |
| 2025/0068665 A1 * | 2/2025 | Chandel | G06F 16/3347 | |

* cited by examiner

*Primary Examiner* — Duy Khuong T Nguyen
(74) *Attorney, Agent, or Firm* — Daly, Crowley, Mofford & Durkee, LLP

(57) ABSTRACT

Methods and apparatuses for intelligent search and reuse of source code are disclosed. A code retrieval system leverages artificial intelligence (AI) to provide a search engine designed to assist users in locating and retrieving relevant code segments. A context-based search functionality retrieves code segments tailored to specific requirements set forth in the search. The system leverages several features, including user reviews, and single-click downloads to streamline code discovery and integration. The system tracks various metrics, including views, downloads, likes, dislikes, and ratings to continuously update and maintain quality assessment features indicative of the quality and usefulness of the segments. The system collects and uses a feedback-driven approach to dynamically refine and optimize code retrieval operations.

20 Claims, 6 Drawing Sheets

SYSTEMS AND METHODS FOR INTELLIGENT RETRIEVAL OF SOURCE CODE

BACKGROUND

Software engineers frequently depend on external code resources to streamline their work and expedite development processes. Often computer source code or segments of source code already written may be reused or re-purposed for use in a new application or program. Reliance on external, unvetted code and code resources can introduce security vulnerabilities and compromised or unreliable code to a company's applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect, a method of retrieving source code may include receiving a query comprising one or more search terms and parsing the query with a language analyzer to generate one or more input keywords. One or more code segments may be identified by matching metadata from a private database according to the one or more input keywords. For each of the one or more code segments, a quality assessment feature may be retrieved. A result set responsive to the query may be generated. The result set may include a list of the one or more code segments and may be generated based on a relevance of the one or more keywords of the query with the quality assessment feature of each of the one or more code segments. The one or more code segments in the results set may be ranked according to the quality assessment feature. At least one interface screen may be displayed including the list of the one or more code segments in the result set.

The method may further include, alone or in combination, one or more of the following features. A download option may be provided including an enterprise private repository URL for each of the one or more code segments in the results set. The language analyzer may tokenize the query into a sequence. The one or more keywords may be prioritized such that the one or more code segments are identified according to a prioritized chain of the keywords. The quality assessment feature may include at least one of a standard compliance, a potential bug, a vulnerability, a reliance score, a compatibility factor, a user rating, an integration factor, and a security score. The result set may be further ranked according to a consistency score. A public database may be queried with the one or more keywords, the result set further including a list of public source code segments. Querying of the public database may include a large language model. A view option may be provided and configured to present at least one of the public source code segments retrieved by the large language model. The at least one interface screen may display the quality assessment feature associated with each of the code segments. A submission of a new code segment and metadata related to the new code segment may be received and stored in the private database. The submission may include at least one of a version number, a support document, an integration factor, a compatibility factor.

According to another aspect, a system may include a memory and at least one processor that is operatively coupled to the memory. The at least one processor may be configured to receive a query comprising one or more search terms and parse the query with a language analyzer to generate one or more input keywords. One or more code segments may be identified by matching metadata from a private database according to the one or more input keywords. For each of the one or more code segments, a quality assessment feature may be retrieved. A result set responsive to the query may be generated. The result set may include a list of the one or more code segments and may be generated based on a relevance of the one or more keywords of the query with the quality assessment feature of each of the one or more code segments. The one or more code segments in the results set may be ranked according to the quality assessment feature. At least one interface screen may be displayed including the list of the one or more code segments in the result set.

The system may further include, alone or in combination, one or more of the following features. The quality assessment feature may include at least one of a standard compliance, a potential bug, a vulnerability, a reliance score, a compatibility factor, a user rating, an integration factor, and a security score. The result set may be further ranked according to a consistency score. A public database may be queried with the one or more keywords where the result set may further include a list of public source code segments. The querying of the public database may include a large language model. A submission of a new code segment and metadata related to the new code segment may be received and stored in the private database. The submission may include at least one of a version number, a support document, an integration factor, a compatibility factor.

According to another aspect, a non-transitory computer-readable medium may store one or more processor-executable instructions, which when executed by at least one processor cause the at least one processor to receive a query comprising one or more search terms and parse the query with a language analyzer to generate one or more input keywords. One or more code segments may be identified by matching metadata from a private database according to the one or more input keywords. For each of the one or more code segments, a quality assessment feature may be retrieved. A result set responsive to the query may be generated. The result set may include a list of the one or more code segments and may be generated based on a relevance of the one or more keywords of the query with the quality assessment feature of each of the one or more code segments. The one or more code segments in the results set may be ranked according to the quality assessment feature. At least one interface screen may be displayed including the list of the one or more code segments in the result set.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Aspects of the present disclosure provide methods and apparatuses for intelligent search and reuse of source code. A code retrieval system, as described herein, may leverage artificial intelligence (AI) to provide a practical application in the form of an innovative search engine designed to assist users in locating and retrieving relevant code snippets, or segments. Aspects of the present disclosure may significantly reduce development time and enhance productivity.

The code retrieval system may include comprehensive features contributing to its effectiveness and ease-of-use. A context-based search functionality may retrieve code segments tailored to specific requirements set forth in the search, ensuring greater accuracy and relevance. Additionally, the system may leverage several features, including user reviews and single-click downloads to streamline code discovery and integration. The system may further track various metrics, including views, downloads, likes, dislikes, and ratings to continuously update and maintain quality assessment features indicative of the quality and usefulness of the segments. The system may collect and use a feedback-driven approach to dynamically refine and optimize code retrieval operations.

Figure 1:
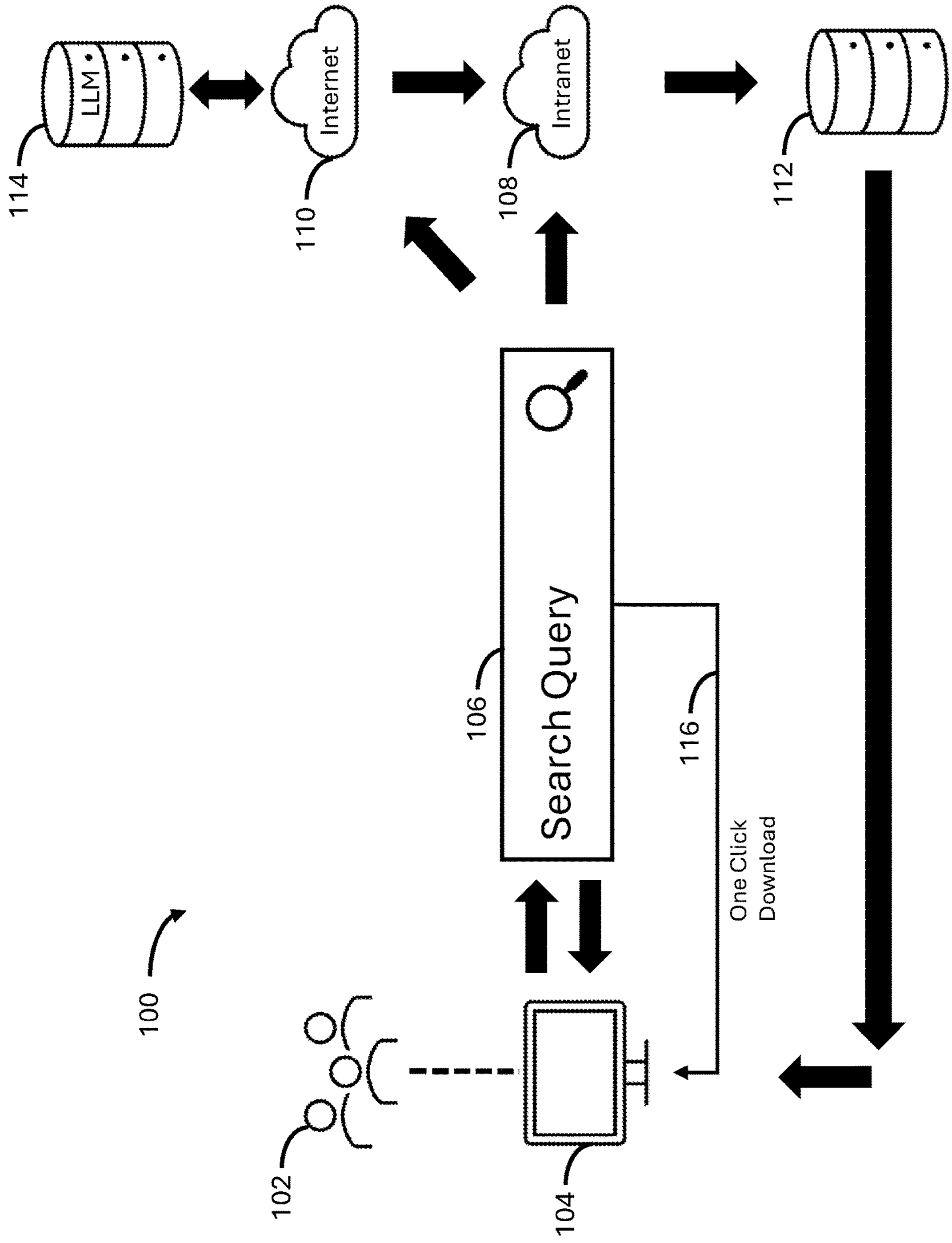
FIG. 1 is a flow diagram of a search and retrieval operation, according to aspects of the present disclosure.

FIG. 1 is a flow diagram of a search and retrieval operation 100, according to aspects of the present disclosure. A user 102 may invoke the code retrieval system through an interface 104, such as an application, webpage, widget, or the like. The interface 104 may present a query input 106 into which the user 102 may enter a search query in the form of one or more search terms related to a source code segment the user 102 wishes to find and/or retrieve. As described herein, the system may be used to retrieve segments of source code from a private database 112 over a private network 108, such as an enterprise intranet or other non-public network. According to one aspect, the system may identify one or more code segments in the private database 112 and return a list of matching code segments to the interface 104 for further handling, including review and/or downloading by the user 102. According to one aspect, the code retrieval system may provide a "one-click download" option 116 to the user 102 configured to directly download and save the results of the query, bypassing the display and review of the retrieved code segments. According to one aspect, a download function may include an enterprise private repository URL for each of the one or more code segments in the results set.

As described herein, the system may additionally or instead submit the query over a public network 110, such as the Internet or other publicly available network, to a public database 114. According to one aspect, the public database 114 may include a large language model (LLM) trained and configured to intelligently retrieve and return code segments relating to the query. As described further below, the system may provide an interface and application to submit and store code segments, retrieved from the public database 114 to the local database 112. The retrieved code segments may be returned to the interface 104 for further handling.

The user 102 may filter, sort, refine or otherwise organize the list of returned code segments according to a number of features, including quality assessment features, compatibility and integration factors, and other metadata associated with each of the code segments.

Figure 2B:
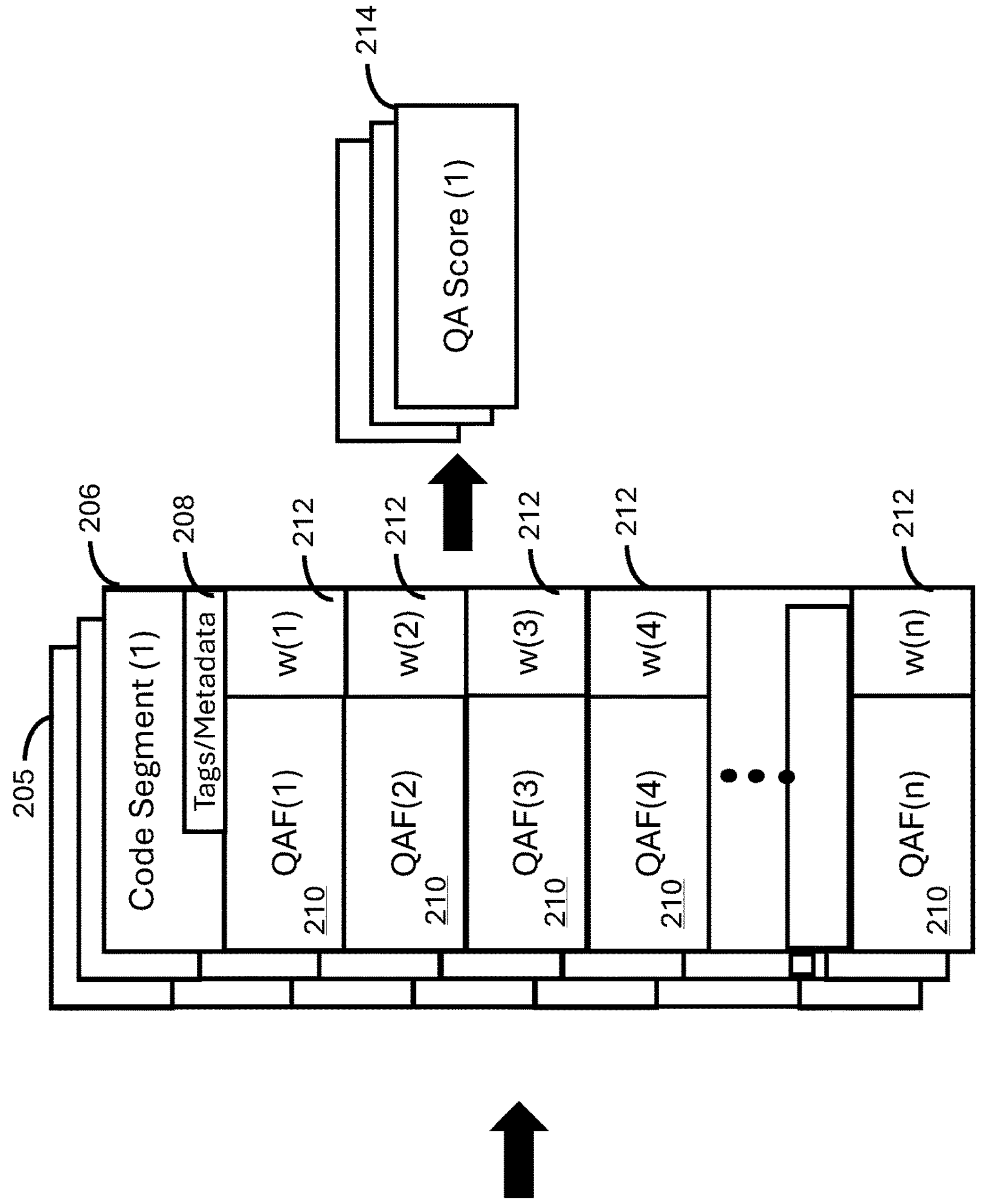
FIG. 2B is a diagram of an exemplary data structure, according to aspects of the present disclosure.
Figure 2A:
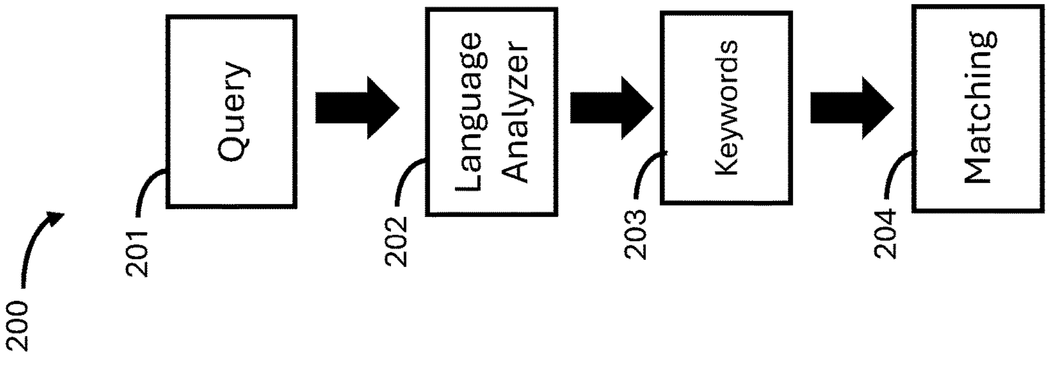
FIG. 2A is a flow diagram of a search query, according to aspects of the present disclosure.

FIG. 2A is a flow diagram of a search query, according to aspects of the present disclosure. A user may enter a search query 201 into the search interface, as described herein. A language analyzer 202 may parse the query into one or more input keywords 203. The language analyzer may extract meaningful elements from the query using a sequential token mapper to generate the one or more input keywords. According to one aspect, the language analyzer may analyze the query in real-time as the query is input to generate and present suggestions to automatically complete the query. The input keywords may then be matched 204, using a prioritized chain of the keywords, to similarly parsed and tokenized code segments stored in the local database. According to one aspect of the disclosure, the matching may occur based on one or more metadata fields associated with the code segments. As detailed below, the metadata may include information such as, without limitation, title, description, tags, quality assessment features, ratings, scores, or the like.

FIG. 2B is a diagram of an exemplary data structure, according to aspects of the present disclosure. According to one or more aspects, code segment a may be stored in such a manner to reflect metadata and other information about the respective segment and facilitate efficient and accurate matching with a search query. Each of the code segments may be stored according to a data structure or other file system including one or more fields related to the code segment. For example, each code segment may be part of or related to a data structure 205 including data maintained and organized according to a number of features. For example, each code segment may include an identifier 206, such as a title, reference number or the like, and tags/metadata fields 208. The tags/metadata field 208 may include information about the code segment including, for example and without limitation, title, author, version, code description, subject matter or other tags, compatibility and integration information, or other metadata.

According to one aspect, the data structure 205 may include a number of quality assessment features (QAF) 210, as described herein. The QAF may include mechanisms and information related to the quality and reliability of the code segment, including without limitation, features such as adherence to coding standards, identifying potential bugs or vulnerabilities, and evaluating the overall reliability and performance of the code. The QAF 210 may further include data such as user ratings, security scores, download and usage statistics, which further enhance the reliability of the given code segment by user-sourcing feedback of certain assessment features. The QAF 210 may ensure that reused code meets the required quality standards for the enterprise and assist in identifying code segments that are not verified, compatible or appropriate for use in a given application.

According to one aspect, the QAF 210 may include a weight factor 212 stored and maintained by the system. Accordingly, the system may use the QAF 210 data and the weight factor 212 to generate a quality assessment (QA) score 214 for each segment. The QA score 214 may be or include a score, rating, or other quantitative value associated with the code segment. The QA score 214 may provide a consistency scoring mechanism based on the weight factors 212 that result in a deterministic code retrieval system. For example, the use of the weighted QAF 210 to generate a QA score 214 may ensure that the same query run at different times may return the same code segments. The consistency of the search matching and results further strengthens the quality of the code and the applications in which the code segments are used.

Figure 3A:
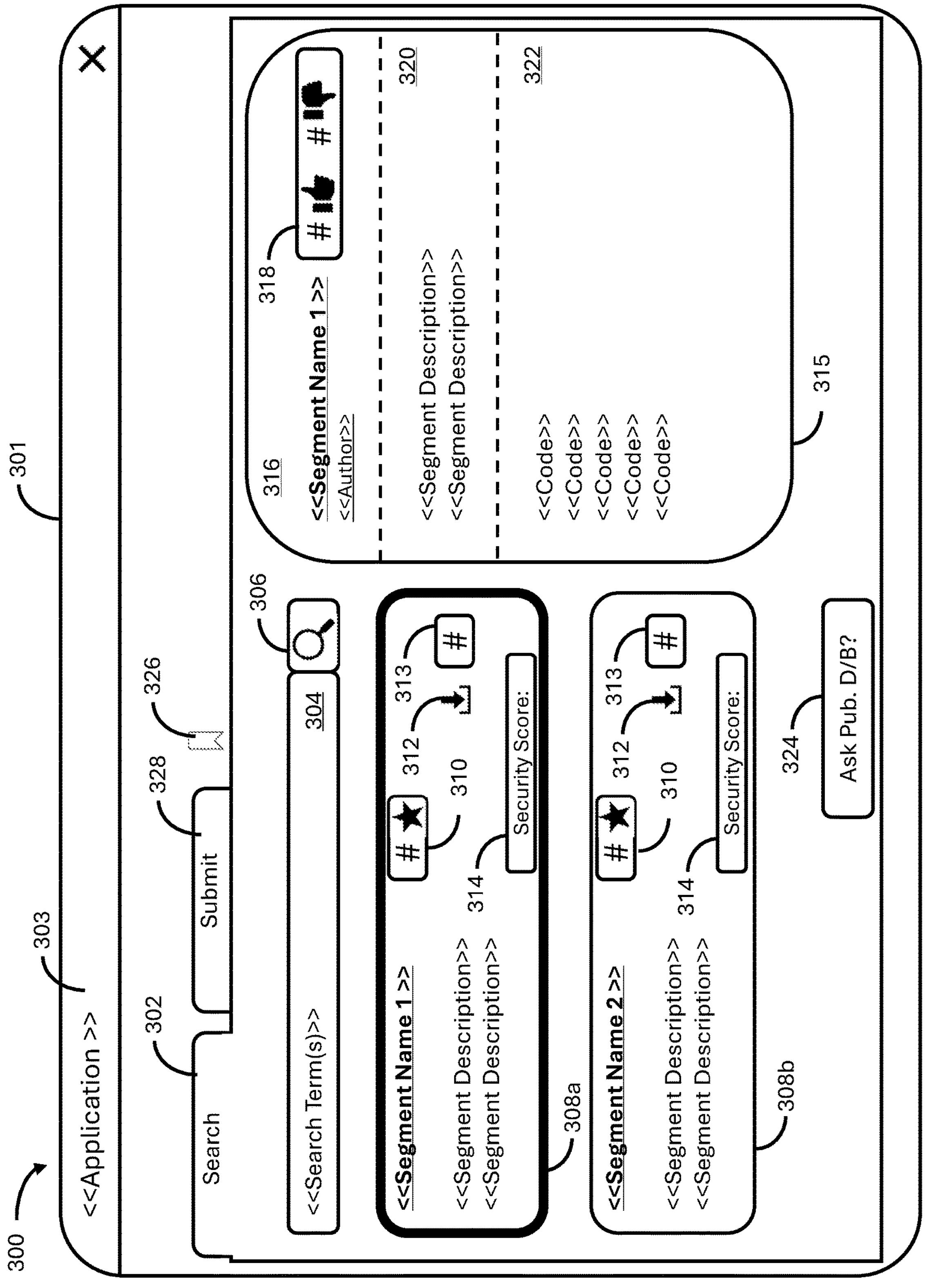
FIG. 3A is a wireframe diagram of an exemplary search user interface, according to aspects of the present disclosure.

FIG. 3A is a wireframe diagram of an exemplary search user interface 300 of a code retrieval system, according to aspects of the present disclosure. The user interface 300 may be presented to a user as a widget 301 or window on a user display. The widget 301 may be invoked using either a web browser or a client application stored on the user's computing device. The widget 301 may include a title bar 303 configured to display an application name or the like. A search tab 302 may be presented when activated by the user, by a mouse-click, tabbing keystroke or other selection mechanism. The search tab 302 may also be a default display interface when the widget 301 is invoked on the user computing device.

According to one aspect, the search tab 302 may include an input window 304 where the user may enter the search terms relating to the code segment sought. As the user enters search terms, the user interface and code retrieval system may cause to be displayed suggestions to complete the search query. Accordingly, the code retrieval system may dynamically analyze and tokenize the search terms as part of the suggestion process. The user may select or confirm the suggestion displayed, or continue to type additional terms until a complete query is formed. A search button 306 may be configured to execute the search when activated by the user.

The code retrieval system, as described herein, may analyze, parse, and/or tokenize the input query and begin to search the private database (e.g., within an enterprise intranet) and match the search keywords for relevant and responsive code segments. The code retrieval system may generate a result set of matching code segments responsive to the query. The user interface 300 may cause to be displayed one or more result windows, shown generally as 308, including a segment name and a segment description. For example, in the exemplary interface of FIG. 3A, a first code segment in a first result window 308*a* and a second code segment in a second result window 308*b* may be displayed in the search tab 302. Each of the code segment windows 308 may be presented through the interface including a number of quality assessment features, such as without limitation, a rating 310, a download number 313, and a security score 314. According to one aspect, a download button or icon 312 may be displayed proximate to the download number 213 providing a fast and efficient mechanism for the user to locally save the segment identified in the window 308. The download option may include an enterprise private repository URL for each of the one or more code segments in the results set.

According to one aspect, each of the windows 308 may be highlighted, focused or otherwise selected to display additional information in a code segment window 315. The code segment window 315 may include the display of additional information and metadata relating to the code segment selected in the result window 308. For example, as shown in FIG. 3A, the first result window may be highlighted and the code segment window 315 may display additional information related to the first code segment in the results list. The additional information presented in the code segment window 315 may include a first portion 316 where certain biographical information, or the like, may be displayed, such as a segment name and an author. An approval rating 318 may also be displayed reflecting a user-sourced feedback metric of approval or disapproval of the code segment. As shown in FIG. 3A, the approval rating may be reflected in a binary, "thumbs-up" or "thumbs-down" rating system, however, it will be recognized that other user-rating scales, scores or other metrics may also or instead be included. A second portion 320 of the code segment window 315 may include a brief description or summary of the code segment and a third portion 322 of the code segment window 315 may display the actual source code of the segment. A save or bookmark option 326 may be presented to the user to save the query and/or results for the user such that the user may quickly retrieve prior queries and results without having to re-enter search terms and re-execute the search.

From this display a user may be readily informed of the quality and reliability of the retrieved code segments. For example, if a particular code segment is shown with a low security score 314, the user may recognize that the code segment retrieved has been identified as having one or more security flaws and may not be best suited for integration into the application for which the user is coding. Additionally, a rating 310 may reflect a scaled score, such as a number of "stars" out of five, according to a number of quality assessment features described herein, including compatibility and integration data, QA scores, and the like. Further, user-sourced data such as a number of downloads 313 and an approval rating 318 may provide additional information to the user to identify quality source code segments that have been successfully and reliably used by other users.

The code retrieval system may further present the user with a public search option 324. The public search option 324 may be activated by the user if no results are found in the private database or the results found and presented are insufficient for the user's present requirements. According to one aspect of the disclosure, the public search option 324 may include a link to a large language model (LLM). Accordingly, the code retrieval system may submit the search terms or tokenized keywords to the LLM to search and match the query, using a prioritized chain of the keywords, to one or more source code segments over a public network, such as the Internet. The code retrieval system may receive and present results to the user. According to one aspect, as described below, the code retrieval system may present the user with an option to save the retrieved code segment to the private database, subject to providing additional information and features of the publicly found code segment. According to another aspect, the system may log and preserve all queries, including the public LLM searches, for monitoring and assessing the quality, security and reliability of code obtained from any source, including public databases and the like.

Figure 3B:
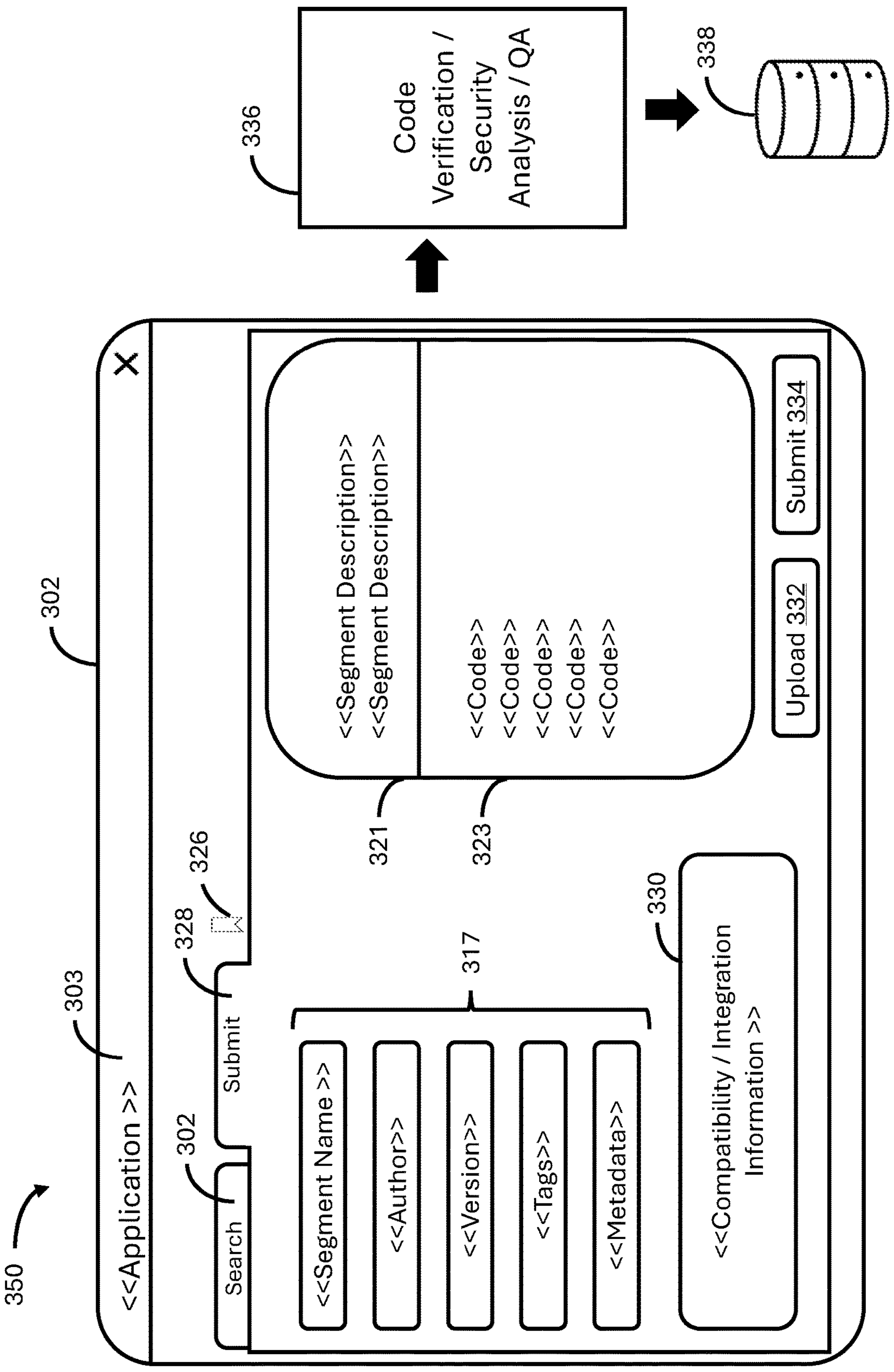
FIG. 3B is a wireframe diagram of an exemplary submission user interface, according to aspects of the present disclosure.

FIG. 3B is a wireframe diagram of an exemplary submission user interface 350, according to aspects of the present disclosure. The code retrieval system may further include and provide the functionality to receive source code submissions from a user within the same widget 301 as the search functionality. The code retrieval system may provide a submission tab 328 presenting the user with a number if inputs associated with a source code segment the user wishes to upload, vet and save to the private database for easy retrieval by the user or others.

According to one aspect, the user may be presented with fillable windows 317 for capturing biographical data and other metadata related to a code segment. Such information may include, without limitation, segment name, author, version, subject matter tags, and other metadata. According to one aspect, the code retrieval system may include version control capabilities, allowing users and auditors to track changes, manage different versions of code segments, and maintain a comprehensive history. The system may further promote documentation practices, ensuring that reused code is well-documented and accompanied by relevant information for future reference.

A code description window 321 may provide a user with the ability to summarize or describe the features and functions of the code segment being submitted. A code window 323 may provide the user with the ability to type or otherwise enter the source code being uploaded. Alternatively, an upload feature 332 may provide the user the ability to select a file in local memory to upload to the interface. The code retrieval system may read the uploaded file and display the text of the source code in the code window 323 for the user to review.

A compatibility and integration field 330 may be used to capture information relating to how and where the code may be acceptable to use. Such information may include standard compliance, dependencies, security compliance, and other requirements for applications that may integrate the code segment. The inclusion and confirmation of compatibility and integration information may allow users to make informed decisions when integrating reused code, minimizing compatibility issues and reducing potential conflicts in an application. The version control and documentation support promote proper code management and knowledge sharing, enhancing collaboration among software engineers.

Once the code segment is entered or uploaded, the user may activate the submit function 334. According to one aspect, the code retrieval system may receive the submission and analyze the submitted information (i.e., the source code and its metadata) according to a code verification policy 336. The verification policy 336 may include a system to analyze the source code according to a number of quality assessment features, described herein. For example, the code may be analyzed according to a security protocol, compliance with one or more standards or integration protocols. The verification policy may further store the submitted code and/or its metadata in a database 338 according to a data structure like that shown in FIG. 2B, including associating one or more quality assessment features with the code segment.

According to one aspect, the code retrieval system, including the verification policy 336 for example, may provide an auditing and control system enabling users' requests, including searches, uploads, and submissions, to be audited. Auditing functions may be automated and conducted by a computing device programmed to analyze and review user interactions according to one or more policies. Alternatively, some of the auditing capabilities may involve supervisory action to review user actions in question. The auditing and control system may further include the ability to control, approve or reject searches and downloads from public networks, databases or LLMs in order to preserve privacy and a secure environment for reusable code.

According to another aspect, the code retrieval system, including the verification policy 336 for example, may include a vulnerability analyzer configured to detect and identify vulnerabilities in the source code based on a predefined policy to rule set. The vulnerability analyzer may ensure the source code segments stored and uploaded to the private database adhere to security standards and other protocols to mitigate risks associated with integrating the code segment into a particular application. If a code segment is determined by the system to have a certain vulnerability or does not adhere to internal standards, the system may flag the code segment identifying it as problematic, remove the code segment, and/or prevent an uploaded segment from being stored in the private database.

Figure 4:
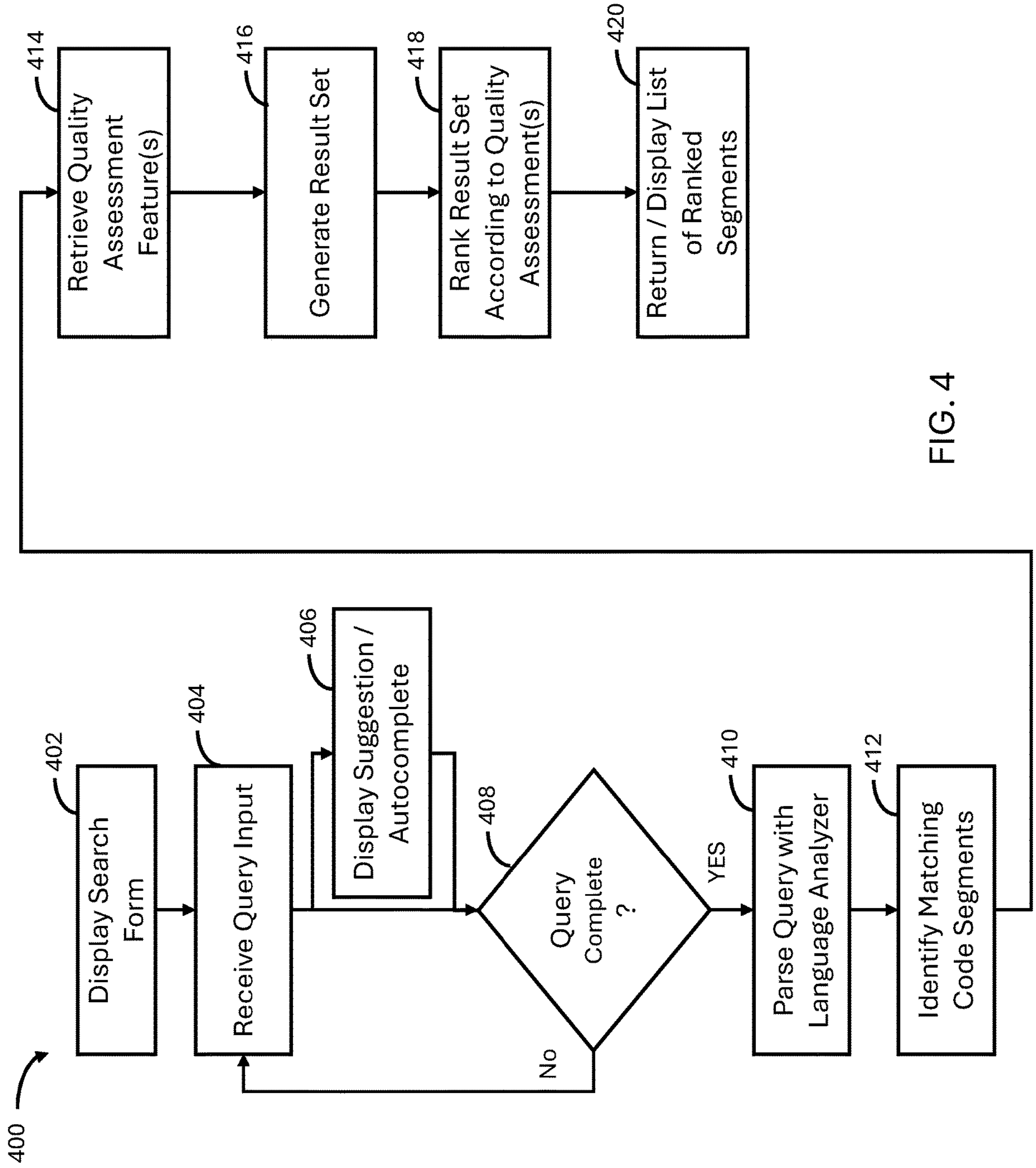
FIG. 4 is a flow diagram of a method for search and retrieval of source code.

FIG. 4 is a flow diagram of a method 400 for search and retrieval of source code according to one or more aspects of the disclosure. As shown in block 402, a code retrieval system may display a search form through a user interface including a widget or web page application. The system may receive a query input from a user, shown in block 404. According to one aspect, as shown in block 406, the system may dynamically provide suggestions to complete, or "autocomplete" the query. As described herein the system may parse and analyze, in real-time, the search terms as they are being input to help in forming suggested query terms for the user. As shown in block 408, the system may determine whether a query is complete, either by a user confirming an autocompleted suggestion or receiving a search command from the user. If the query is not complete, or the user continues to enter more terms, the method 400 continues to receive input into the search form until the query is complete.

As shown in block 410, once the query is complete, the system may parse the query with a language analyzer with tokenization of the search term to generate keywords. To the extent the system includes a suggestion and/or autocomplete feature, described above, the already analyzed and tokenized terms may be carried through to a matching process, shown in block 412. According to one aspect, the matching process may search and identify code segments stored in a private database that include metadata with one or more keyword matches with the search query. The system may further retrieve one or more quality assessment features, shown in block 414, associated with each code segment identified. The quality assessment features, as described herein, may include for example, information related to the quality and reliability of the code segment, including without limitation, features such as adherence to coding standards, identifying potential bugs or vulnerabilities, and evaluating the overall reliability and performance of the code. The quality assessment features may further include data such as user ratings, security scores, download and usage statistics, which further enhance the reliability of the given code segment by user-sourcing certain assessment features.

As shown in block 416, the system may generate a results set including one or more code segments based on the relevance of the one or more keywords of the query with the quality assessment feature of each of the code segments. According to one aspect, the results set may be ranked according to one or more quality assessment features, shown in block 418. The ranked list may be displayed through the user interface, shown in block 420, as described herein. From the list, the user may select and review the metadata and other information associated with the code segment, including the quality assessment features that resulted in the code segment being retrieved. For example, user-ratings, number of downloads, security scores, and other information may be readily displayed in the interface to reflect the quality, security and reliability of the retrieved source code segments.

By providing users with a reliable and efficient mechanism to access and retrieve source code segments, the system not only enhances development speed but may further promote sustainable coding practices. The system's optimization of code reuse may reduce redundancy and minimize the environmental impact associated with excessive code duplication. Through these combined technical and practical applications and advantages, the code retrieval system may allow users to achieve higher productivity while adhering to security standards and promoting environmentally conscious coding practices.

Figure 5:
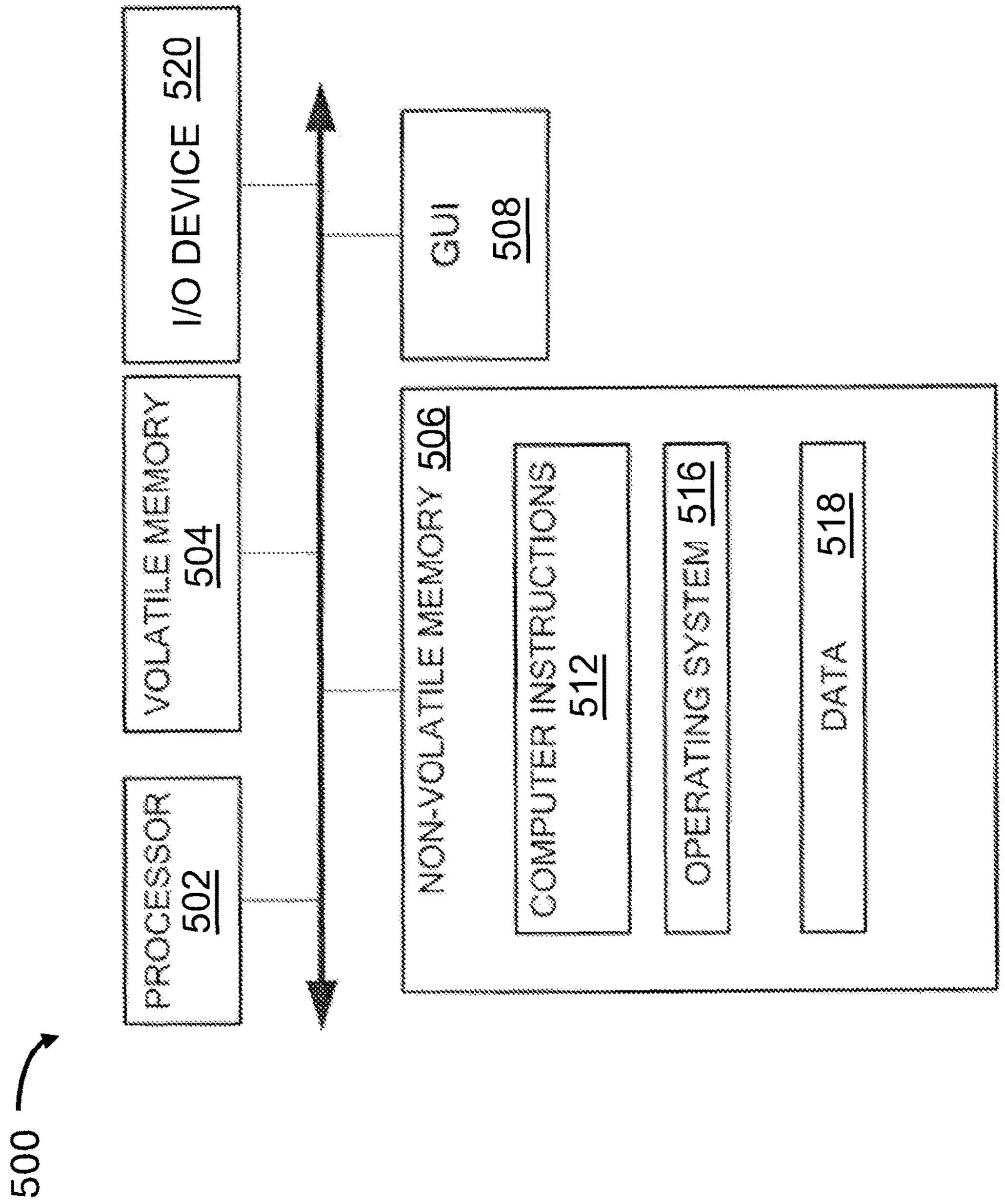
FIG. 5 is a diagram of an example of a computing device, according to aspects of the disclosure.

Referring to FIG. 5 in some embodiments, a computing device 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504. Program code may be applied to data entered using an input device of GUI 508 or received from I/O device 520.

FIGS. 1-5 are provided as an example only. In some aspects or embodiments, the term "I/O request" or simply "I/O" may be used to refer to an input or output request. In some embodiments, an I/O request may refer to a data read or write request. At least some of the steps discussed with respect to FIGS. 1-5 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

What is claimed is:

1. A method of retrieving source code, the method comprising:

receiving a query comprising one or more search terms;

parsing the query with a language analyzer to generate one or more input keywords;

identifying one or more code segments by matching metadata from a private database according to the one or more input keywords;

for each of the one or more code segments, retrieving a quality assessment feature;

generating a result set responsive to the query, the result set comprising a list of the one or more code segments and generated based on a relevance of the one or more input keywords of the query with the quality assessment feature of each of the one or more code segments;

ranking the one or more code segments in the results set according to the quality assessment feature; and causing at least one interface screen to be displayed comprising the list of the one or more code segments in the result set.

2. The method of claim 1 further comprising providing a download option including an enterprise private repository URL for each of the one or more code segments in the results set.

3. The method of claim 1 wherein the language analyzer tokenizes the query into a sequence.

4. The method of claim 3 comprising prioritizing the one or more keywords wherein the one or more code segments are identified according to a prioritized chain of the keywords.

5. The method of claim 1 wherein the quality assessment feature includes at a least one of a standard compliance, a potential bug, a vulnerability, a reliance score, a compatibility factor, a user rating, an integration factor, and a security score.

6. The method of claim 1 wherein the result set is further ranked according to a consistency score.

7. The method of claim 1 further comprising querying a public database with the one or more keywords, the result set further including a list of public source code segments.

8. The method of claim 7 wherein the querying of the public database includes a large language model.

9. The method of claim 8 further comprising providing a view option configured to present at least one of the public source code segments retrieved by the large language model.

10. The method of claim 8 wherein the submission includes at least one of a version number, a support document, an integration factor, a compatibility factor.

11. The method of claim 1 further causing the at least one interface screen to display the quality assessment feature associated with each of the code segments.

12. The method of claim 1 further comprising:

receiving a submission of a new code segment and metadata related to the new code segment and storing the submission in the private database.

13. A system comprising:

a memory; and at least one processor that is operatively coupled to the memory, the at least one processor being configured to perform the operations of:

receiving a query comprising one or more search terms;

parsing the query with a language analyzer to generate one or more input keywords;

identifying one or more code segments by matching metadata from a private database according to the one or more input keywords;

for each of the one or more code segments, retrieving a quality assessment feature;

generating a result set responsive to the query, the result set comprising a list of the one or more code segments and generated based on a relevance of the one or more input keywords of the query with the quality assessment feature of each of the one or more code segments;

ranking the one or more code segments in the results set according to the quality assessment feature; and causing at least one interface screen to be displayed comprising the list of the one or more code segments in the result set.

14. The system of claim 13 wherein the quality assessment feature includes at a least one of a standard compliance, a potential bug, a vulnerability, a reliance score, a compatibility factor, a user rating, an integration factor, and a security score.

15. The system of claim 13 wherein the result set is further ranked according to a consistency score.

16. The system of claim 13 further comprising querying a public database with the one or more keywords, the result set further including a list of public source code segments.

17. The system of claim 16 wherein the querying of the public database includes a large language model.

18. The system of claim 13 further comprising:

receiving a submission of a new code segment and metadata related to the new code segment and storing the submission in the private database.

19. The system of claim 18 wherein the submission includes at least one of a version number, a support document, an integration factor, a compatibility factor.

20. A non-transitory computer-readable medium storing one or more processor-executable instructions, which when executed by at least one processor cause the at least one processor to perform the operations of:

receiving a query comprising one or more search terms;

parsing the query with a language analyzer to generate one or more input keywords;

identifying one or more code segments by matching metadata from a private database according to the one or more input keywords;

for each of the one or more code segments, retrieving a quality assessment feature;

generating a result set responsive to the query, the result set comprising a list of the one or more code segments and generated based on a relevance of the one or more input keywords of the query with the quality assessment feature of each of the one or more code segments;

ranking the one or more code segments in the results set according to the quality assessment feature; and causing at least one interface screen to be displayed comprising the list of the one or more code segments in the result set.

* * * * *